United States Patent [19]

Nakao et al.

[11] Patent Number: 5,127,796
[45] Date of Patent: Jul. 7, 1992

[54] ROTARY PUMP HAVING AN ENCAPSULATED MOTOR

[75] Inventors: Haruki Nakao; Katsuji Kikuchi, both of Oota, Japan

[73] Assignee: Nikki Co., Ltd., Tokyo, Japan

[21] Appl. No.: 758,183

[22] Filed: Sep. 12, 1991

Related U.S. Application Data

[63] Continuation of Ser. No. 549,247, Jul. 9, 1990, abandoned, which is a continuation of Ser. No. 304,592, Feb. 1, 1989, abandoned.

[30] Foreign Application Priority Data

Feb. 8, 1988 [JP] Japan .......................... 63-15510

[51] Int. Cl.⁵ ............................................ F04B 17/00
[52] U.S. Cl. ........................................... 417/420
[58] Field of Search ........................................ 417/420

[56] References Cited

U.S. PATENT DOCUMENTS

| 2,968,248 | 1/1961 | Carter | 417/420 |
| 2,970,548 | 2/1961 | Berner | 417/420 |
| 2,996,994 | 8/1961 | Wright | 417/420 |
| 3,932,069 | 1/1976 | Giardini et al. | |

FOREIGN PATENT DOCUMENTS

| 0142095 | 7/1985 | Japan | 417/420 |
| 0142096 | 7/1985 | Japan | 417/420 |
| 757062 | 9/1956 | United Kingdom . | |
| 1108308 | 4/1968 | United Kingdom . | |
| 1242243 | 8/1971 | United Kingdom . | |
| 1496035 | 12/1977 | United Kingdom . | |
| 1552471 | 8/1979 | United Kingdom . | |
| 2141040 | 12/1984 | United Kingdom . | |
| 2181184 | 4/1987 | United Kingdom . | |
| 2181660 | 4/1987 | United Kingdom . | |

*Primary Examiner*—Richard A. Bertsch
*Assistant Examiner*—David W. Scheuermann
*Attorney, Agent, or Firm*—Nixon & Vanderhye

[57] ABSTRACT

A rotary pump comprising a pump unit having a pump and a motor unit separated from the pump unit and having a motor for driving the pump. The rotary pump further comprises a watertight housing enclosing the motor and including a non-magnetic wall made of material which permeates magnetism, an input section attached to the pump, an output section attached to the motor and opposing the input section, with the non-magnetic wall interposed between the output section and the input section, and at least two magnets, one of which is fixed to that surface of the output section which opposes the input section, and the other of which is fixed to that surface of the input section which opposes the output section.

1 Claim, 3 Drawing Sheets

ROTARY PUMP HAVING AN ENCAPSULATED MOTOR

This is a continuation of application Ser. No. 07/549,247, filed Jul. 9, 1990, now abandoned, which is a continuation of application Ser. No. 07/304,592, filed Feb. 1, 1989, now also abandoned.

BACKGROUND OF THE INVENTION

1. Field of the Invention

The present invention relates to a rotary pump having an encapsulated motor, comprising a pump unit and a motor unit which are physically separated from each other and magnetically coupled to each other.

2. Description of the Related Art

A pump is known for use in combination with a water-jet massage apparatus for taking up hot water from a bathtub and jetting the hot water via a nozzle back into the bath. This pump has a housing, a pump unit, and a motor unit. Both units are located in the bathtub, and the shaft of the pump unit is connected to the shaft of the motor unit.

The shaft of the motor unit is, of course, shielded in watertight fashion by means of a seal ring. However, the watertight sealing is not sufficient, inevitably because the shaft of the motor unit is in sliding contact with the seal ring. Therefore, the user of the pump must be very careful to allow no water from leaking into the motor unit.

SUMMARY OF THE INVENTION

The object of the present invention is to provide a rotary pump having an encapsulated motor, which comprises a motor unit having a watertight capsule and a motor contained in the capsule for driving a pump.

According to the invention, there is provided a rotary pump which comprises: a pump unit having a pump; a motor unit separated from the pump unit and having a motor for driving the pump; a watertight housing enclosing the motor and including a non-magnetic wall made of material which permeates magnetism; an input section attached to the pump; an output section attached to the motor and opposing the input section, with the non-magnetic wall interposed between the output section and the input section; and at least two magnets, one of which is fixed to the surface of the output section which opposes the input section, and the other of which is fixed to the surface of the input section which opposes the output section.

When the motor is driven, the output section attached to the motor unit encapsulated in the watertight housing is magnetically transmitted to the input section secured to the pump unit, by virtue of the magnetic coupling between the magnet fixed to the output section and the magnet fixed to the input section. The input section is therefore rotated, thus rotating the pump unit. In other words, the motor unit is magnetically coupled to the pump unit, though it is physically disconnected from the pump unit.

As can be understood from the above, the rotary pump according to the present invention is characterized in two respects. First, at least the motor is encapsulated in the watertight housing. Secondly, the output section of the motor unit is magnetically coupled with the input section of the pump unit, with the non-magnetic wall interposed between these units. Hence, no liquid can leak from the pump unit into the motor unit, and the function of the motor unit is not impaired even if the pump unit becomes wet with liquid.

DETAILED DESCRIPTION OF THE PREFERRED EMBODIMENTS

The embodiments of the present invention will now be described with reference to the accompanying drawings.

Figure 1:
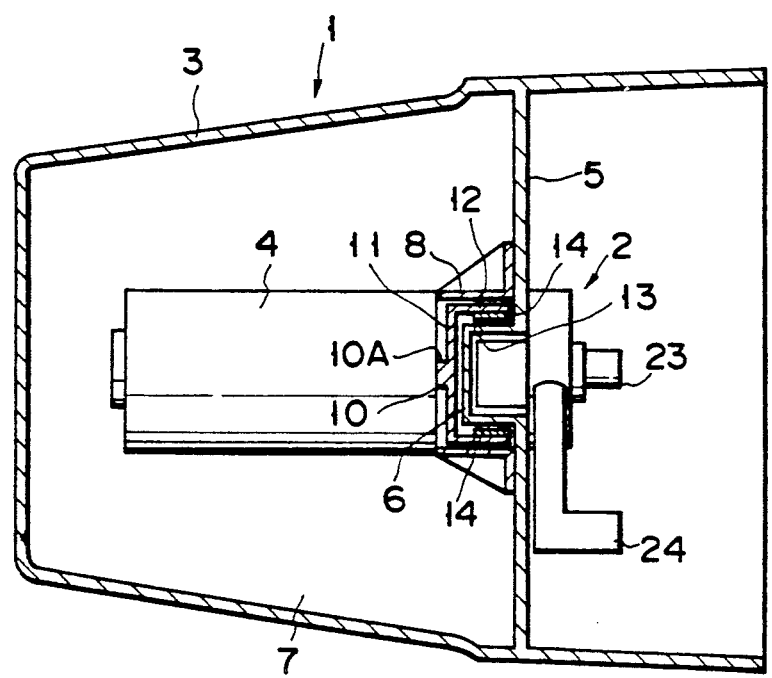
FIG. 1 is a partial section view of a rotary pump according to the present invention, which has an encapsulated motor.

FIG. 1 illustrates the rotary pump, an embodiment of the invention, which has an encapsulated motor. As is shown in this figure, the rotary pump comprises a motor unit 1 and a pump unit 2. The motor unit 1 comprises a watertight housing 3 and a motor 4 sealed within the housing 3. The housing 3 is made of electrically insulative material such as plastic. The motor unit 1—which is encapsulated—further comprises a rotary section 10A located very close to a wall 5 which is a part of watertight housing 1. The wall 5 is permeable to magnetism, and its center portion is bulging into the space 7 defined by housing 1, thus forming a bottomed cylindrical wall 6. The casing 8 of the motor 4 is fastened to wall 5, enclosing this cylindrical wall 6.

The rotary section 10A comprises the shaft 10 of the motor 4 and a holder 11 fixed to the distal end of the shaft 10. The holder 11 is made of non-magnetic material and has a rectangular cross section. The holder 11 is a bottomed hollow cylinder and located in the gap between the casing 8 and the circumferential surface of the cylindrical wall 6.

Figure 2:
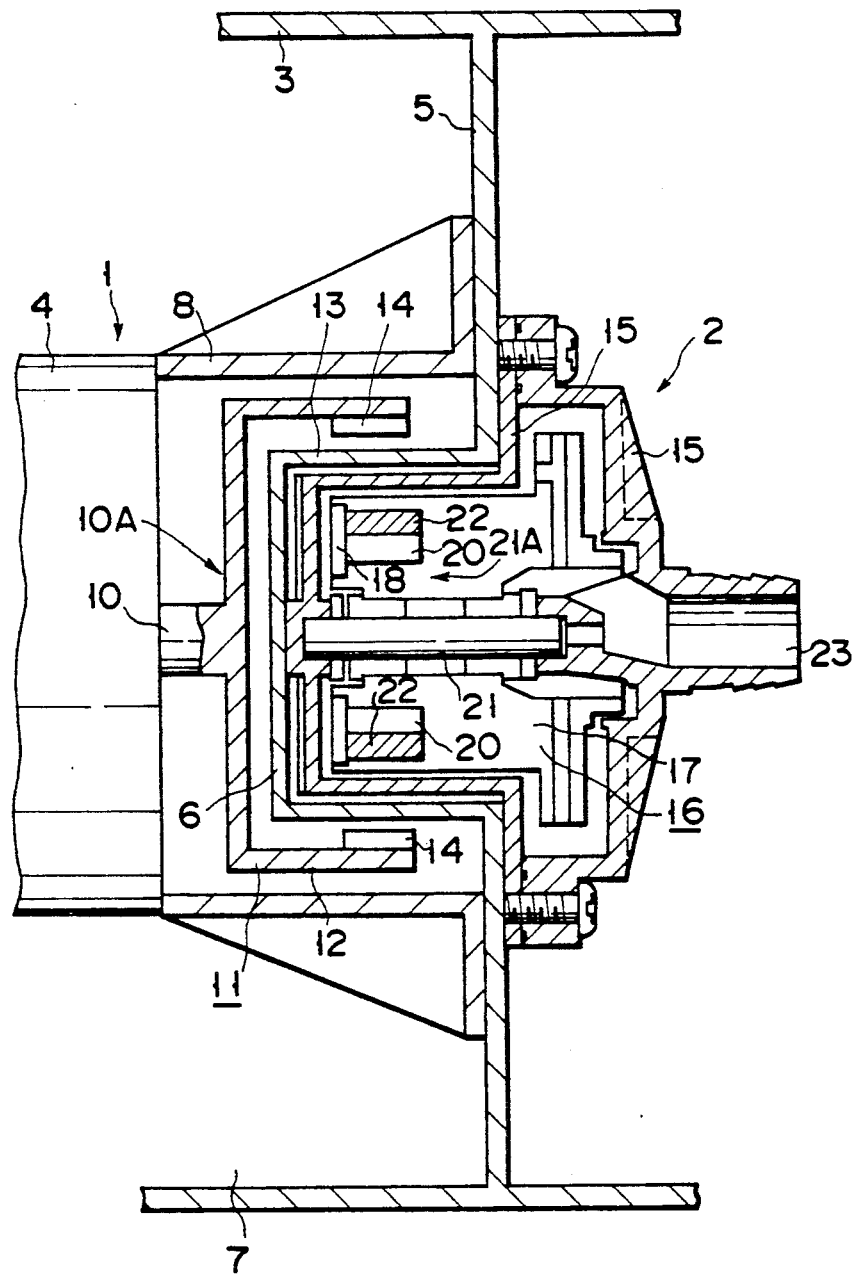
FIG. 2 is a sectional view showing how the motor unit and the pump unit of the rotary pump are magnetically connected to each other.

A plurality of permanent magnets 14 are secured to the inner circumferential surface of the holder 11 by means of an adhesive. As is shown in FIG. 1, these magnets 14 are spaced apart at regular intervals around the circumference 12 of the holder 11. They oppose the outer circumferential surface of the bottomed cylindrical wall 6, with a narrow gap left between them and the outer circumferential surface of the cylindrical wall 6. If necessary, a yoke can be interposed between the inner circumferential surface 12 of the holder, on the one hand, and the permanent magnets 14, on the other. As is shown in FIG. 2, the pump unit 2 is also encapsulated, or enclosed in a casing 15 fastened to the wall 5 of the housing 3. The pump unit 2 has a rotary section 21A which comprises an impeller 16, support plates 18, yokes 20, a shaft 21, and permanent magnets 22. The impeller 16 is mounted on the shaft 21, and is located within the casing 15 which defines a pump chamber. The support plates 18, which are made of non-magnetic material, are fixed to the vanes 17 of the impeller 16. The yokes 20 are coupled to the support plates 18 and extend substantially parallel to the shaft 21. The magnets 22 are fastened to the outer peripheries of the yokes 20.

The pump unit 2 is arranged within the housing 3. More precisely, it is inserted in the bottomed cylindrical wall 6. The motor unit 1 and the pump unit 2 are so positioned that the permanent magnets 14 are opposed closely to the permanent magnets 22, with the side wall 13 of the cylindrical wall 6 interposed between the sets of these magnets. The magnets 14 are of the opposite polarities, alternately arranged side by side on the inner circumferential surface 12 of the holder 11. Similarly, the magnets 22 are of the opposite polarities, the magnets 22 of either polarity are arranged on the alternate yokes 20. Any two magnets 14 and 22 that oppose each other are of different polarities and attract each other. As a result, the shaft 21 of the pump unit 2 is magnetically coupled to the shaft 10 of the motor 4.

When the motor 4 is driven, the shaft 21 is rotated since it is magnetically connected to the shaft 10 of the motor 4. As a result, the impeller 16 mounted on the shaft 21 is rotated within casing 15, thereby taking in the liquid into the pump chamber (i.e., the casing 15) through an inlet port 23. The liquid is pressurized in the pump chamber and subsequently discharged from the chamber through an outlet port 24.

Figure 3:
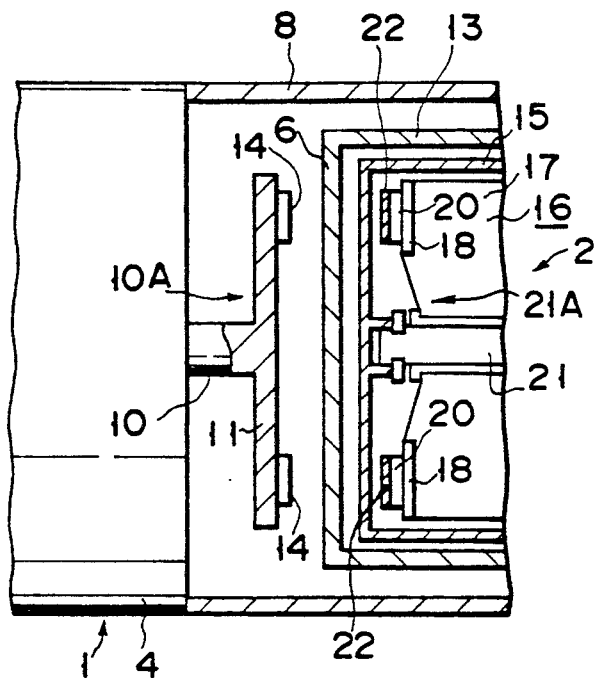
FIG. 3 is also a sectional view illustrating the modifications of the motor unit and the pump unit, both shown in FIG. 2.
Figure 4:
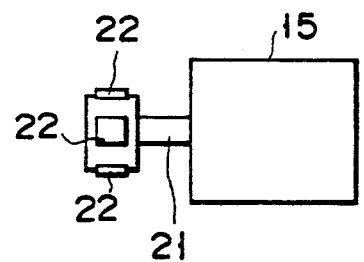
FIG. 4 is a side view showing another modification of the pump unit.

The present invention is not limited to the embodiment described above. Various changes and modifications can be made without departing from the scope of the invention. For instance, the pump unit 2, which has an impeller, can be replaced by a rotary pump of any other type. Further, as is shown in FIG. 3, the permanent magnets 14 can be fastened to that surface of the holder 11 which opposes the bottom of cylindrical wall 6, instead of being fastened to the inner circumferential surface of the holder as is illustrated in FIG. 2. If this is the case, the permanent magnets 22 of the pump unit 2 must be secured to that surface of the support plates 18 which opposes the bottom of cylindrical wall 6 and, hence, opposes the permanent magnets 14. Moreover, as is illustrated in FIG. 4, the permanent magnets 22 of the pump unit 2 can be secured to the surface or outer circumferential surface of a drum attached to the distal end of the shaft 21 extending outward through the casing 15, so that the magnets 22 oppose the permanent magnets 14 of the motor unit.

What is claimed is:

1. A rotary pump comprising:

a pump unit having an impeller and a pump casing which defines a pump chamber, the impeller being located within the pump casing;

a motor unit separated from the pump unit and comprising a motor for driving the pump and a motor casing which surrounds the motor;

a watertight housing completely enclosing the motor unit and including at least one non-magnetic wall made of material which permeates magnetism;

an input section attached to the impeller;

an output section attached to the motor and radially surrounding the input section, with the non-magnetic wall interposed between the output section and the input section; and at least two magnets, one of which is fixed to a surface of the output section which opposes the input section, and the other of which is fixed to a surface of the input section which opposes the output section;

wherein the non-magnetic wall of said watertight housing physically separates said motor casing from said pump casing and completely prevents water from leaking into the motor, and is indented toward the output section; and further wherein the motor casing and the pump casing are fastened directly to opposite surfaces of said non-magnetic wall of said watertight housing, respectively; and the surface of the output section and the surface of the input section opposing each other are constructed so as to connect magnetically with each other by means of said at least two magnets fixed to both surfaces.

* * * * *